Patented May 14, 1940

2,200,691

UNITED STATES PATENT OFFICE 2,200,691

LAMINATED VITRIFORM SHEET

Carleton Ellis, Montclair, N. J., assignor to Ellis-Foster Company, a corporation of New Jersey No Drawing. Application April 21, 1927,
Serial No. 185,660

21 Claims. (Cl. 49—81)

This invention relates to laminated glass, composed of sheets of glass joined by plastic material containing urea formaldehyde resin or related substance.

When two sheets of glass with an intermediate plastic layer are assembled, a "sandwich" is formed which is not as easily shattered by a sudden blow. Moreover, if shattered, the fragments are not prone to be projected in various directions from the point of impact, but tend to scatter to a lesser degree.

Urea resin, as set forth in my copending application Serial No. 689,165, filed January 28, 1924, made by reacting together urea, formaldehyde and phthalic anhydride, can be used to join two panes of glass together to secure a "sandwich" of improved shock resistance, (see page 29). Careful baking to avoid bubbles serves to harden the bonding agent.

Also, as set forth in the same application, the resin may be modified by glycerol, casein, gelatine, Irish moss, algin, and other modifying and tempering agents.

In the present invention I preferably employ a modifying agent which will give improved flexibility and adhesion to the urea resin and have found glycerol and glycol especially suited for the purpose.

A resin may be prepared by reacting on urea, 180 parts by weight, with aqueous (40%) formaldehyde solution, 720 parts, and phthalic anhydride, 18 parts. The reaction mixture was heated to gentle ebullition for several hours until a heavy syrup was obtained. This, on cooling, solidified to a white cheesy mass. The product contained approximately 55% resin. 50 parts of this white material and 25 parts glycerol were mixed and heated until a clear solution formed and evaporation allowed to progress to yield a nearly water-white viscous product, barely flowable at room temperature and capable of being drawn out into very long slender threads.

One prime requisite of a bonding agent in making laminated glass for use as window glass, in automobiles and the like, where constant exposure to sun and heat obtains, is absence of discoloration. The urea formaldehyde resin is notably resistant to change of color in light and preserves its white transparent clarity over long periods, even under drastic service conditions. This is particularly true of urea resin made with organic acid reactants, particularly such acids as phthalic acid and its anhydride, oxalic acid, and the like. If the reaction is brought about in an alkaline medium the products are more sensitive to heat and I have observed, on making quick aging tests by baking, there is considerable tendency to discoloration to yellow or brown products. Accordingly therefore I prefer to employ an acid reactant in making the resin or, if made in an alkaline medium, the resulting material when used in making laminated glass preferably is brought to a condition slightly on the acid side, represented by pH of trifling magnitude, or a more acid condition may be engendered by employment of a larger proportion of an appropriate acid body. It is important that such acid has no harmful effect on the urea resin, on the glass, or on any other substances incorporated with the resin.

The same observations hold true when between the sheets of glass there is interposed a sheet of Celluloid or nitrocellulose composition, cellulose acetate, cellulose ether, and the like. Bodies such as nitrocellulose are rather readily affected by alkalies and to some extent by a high content of organic acid. Preferably, therefore, the urea resin used to join the sheet of nitrocellulose to the two sheets of glass is only faintly on the acid side.

As stated in Serial No. 689,165, and in Serial No. 28,505, syrups obtained by the action of formaldehyde on urea, especially in the presence of organic acid reactants, are soluble or miscible with organic solvents such as methyl or ethyl alcohol, or better, with a ketone such as acetone. The ability to employ solvents of this character which also are solvents for nitrocellulose or have a softening effect thereon renders this property of value in some cases. This is especially true when sheets of, for example, nitrocellulose are placed between sheets of glass, and the whole cemented together by urea resin solution.

Likewise as stated in Serial No. 28,505 the phthalic-urea complex, when not baked or exposed to any high degree of heat, is soluble in various liquids of higher boiling point than acetone. Thus furfural or various ketones, likewise phenol, may be employed in some cases. A solution of the well dried resinous complex may be dissolved in furfural and a solution of nitrocellulose and acetone admixed with it to yield a clear product. Of course furfural is discolored by the action of acids, hence the more nearly neutral the composition the less the degree of discoloration. Furfural, however, is not recommended for use in making laminated glass which is to be water white, but may be employed in connection with laminated glasses designed to produce certain color effects.

Among the acid reactants set forth in Serial No. 28,505 and in Serial No. 689,165 are benzoic, citric, acetic anhydride, propionic, lactic, maleic, salicylic, acetyl salicylic, tartaric and trichloracetic acid. As plasticizing agents I prefer the polyhydric alcohols including, in addition to glycerol, various glycols, such as ethylene and propylene glycols, also in some cases glucose or similar derivatives, pentaerithrytol, mannose, and the like. Mixtures of glycerol, glycol, or the other plasticizing agents set forth may be made as desired. The proportion of the plasticizer may be varied to secure products ranging from thick viscous syrups to hard glass-like substances. I do not limit myself to the polyhydric alcohols as plasticizing agents, but as stated in Serial No. 689,165 may employ various substances, other than glycerol, as modifying or tempering agents, these including casein, gelatine, Irish moss, algin and the like.

Neither do I limit myself solely to urea formaldehyde resin, but may employ derivatives of urea in whole or in part, including, for example, some of the thiocarbamide derivatives. In addition to aqueous formaldehyde, I may employ paraform or other polymers of formaldehyde and also various other resinifying aldehydes, either alone or in admixture with formaldehyde.

The proportion of aldehyde to urea set forth in the illustration may be departed from to a considerable extent and still obtain bonding agents which, when properly plasticized, are available for use within the confines of the present invention. I therefore do not limit myself to any specific proportions, but may use any reacting composition yielding a product having the characteristic properties desired.

When making the syrupy material with the employment of aqueous formaldehyde, it is desirable to eliminate all, or a large part, of the water. This may be carried out by the introduction of glycerol or similar plasticizer and heating until the water is expelled sufficiently. With paraform, water may be largely eliminated from the zone of the reaction.

The drying operation may, if desired, be carried out in a vacuum dryer. It should be borne in mind that the urea resin tends to harden quite rapidly when the temperature is raised well above atmospheric temperatures, as for example, set forth in the foregoing applications urea resin may be molded and hardened at a temperature above 100° C., preferably around 120–130 C. The precise manner of assembling the glass plates to make the laminated sheet depends upon the consistency of the plasticized urea resin. Preferably the sheets of glass are warmed, and to one side of each of two sheets a solution of the urea resin is applied. The sheets then may be heated to expel volatile solvents and then pressed in a hydraulic press, applying pressure gradually from the center outwardly, thereby causing bubbles to flow from the center to the edges and there to be expelled. Another method is to apply urea resin composition as a thick syrup, free from bubbles, to the central portion of one of the sheets of glass, placed in a horizontal position. The second sheet of glass is superimposed so that its center comes in contact with the pool of syrup. On applying gentle pressure the syrup will flow outwardly and fill the entire space between the two sheets of glass.

Laminated glass made of two sheets in this way may be used in some cases without any further treatment other than possibly that of sealing the edges with a substance preventing penetration of water. The interposed layer of soft yielding and adhesive urea resin composition has a pronounced bonding effect, and also prevents the glass from scattering freely when disrupted by impact. In the preferred form of the invention I contemplate a transparent laminated integral sheet consisting of two panes of glass and an adherent plastic sandwich layer containing preferably urea resin and a polyhydric alcohol such as glycerol. However, the invention is not limited to two panes of glass, but may be constructed with three or more panes as desired. Therefore while I have expressly set forth the production of a transparent laminated integral sheet comprising two panes of glass, it is understood that I include thereby a plurality of panes (two or more) as desired.

Further I may employ ordinary glass instead of plate glass in making the product of the present invention as the index of refraction of my preferred composition so closely corresponds to that of ordinary continuous process window glass that slight surface irregularities, waviness and the like, are not magnified by the "sandwich" treatment, but tend to be suppressed in an advantageous manner.

As indicated, various proportions of glycerol to urea resin may be employed. For example, using 5 to 6 parts of the resin to 1 of glycerol a firm transparent, slightly flexible product results. A flexible film may be obtained by incorporating 2 or 3 parts of the resin with 1 part of glycerol. A soft sticky product results by using approximately equal weights as set forth in the above illustration. In applying the mixture of the urea resin and glycerol, it is desirable to warm somewhat, but to maintain the temperature below the point at which bubbles form. In some cases, as noted, acetone or other volatile organic solvent may be used as a thinning agent. The incorporation of other synthetic resins such as white acetone resin or vinyl acetone resin (methylene ketone resin) with urea resin in conjunction with any of the foregoing plasticizing agents, or if desired with such plasticizing agents omitted, is not precluded. A white, transparent, flexible, and soft acetone resin made by the reaction of paraform with acetone in the presence of trisodium phosphate when incorporated with urea resin exerts a softening effect thereon to a considerable extent, and therefore falls in the class of both plasticizer and resin.

In connection with the employment of urea resin for the cementing of mica flake to produce composite sheets, reference is made to my copending application Serial No. 735,600. The various formulae and procedures set forth therein with respect to mica may be applied herein, especially in conjunction with plasticizing agents as aforesaid.

Thus in companion copending application, Serial No. 735,600, in place of urea, mixtures of the latter and thiourea and the like may be employed, or even condensation products of thiourea without the urea by subjecting such materials to appropriate treatment with formaldehyde. In place of formaldehyde, paraform and other polymers of formaldehyde may be employed and in some cases hexamethylenetetramine by itself or in conjunction with formaldehyde. Furthermore the invention does not preclude the use of other aldehydes capable of yielding with urea substances having an adhesive or cementing property with respect to mica. Preferably I employ an acid catalyst, such as phthalic acid or other organic acid such as benzoic, chloracetic, oxalic acids and the like. It is also possible to use catalytic proportions of mineral acids such as hydrochloric acid. In other cases an alkaline catalyst such as ammonia or caustic soda may be employed. Sometimes it is feasible in preparing the syrup to start the reaction with a small amount of an alkaline catalyst and then acidulate with acid catalyst such as phthalic acid. The invention however contemplates the use of urea resin whether made in acid, alkaline or neutral solution.

It also may include urea phenol formaldehyde resin prepared for example by reacting on urea and phenol with formaldehyde in the presence of phthalic acid or other catalyst. For adherence to mica, however, the use of phenol is not recommended, at least in such amount that it would diminish the cementing power below that necessary for cementing the mica material together.

The baking operation described in said application likewise may be utilized to harden the intermediate layer of the present invention. The baking should be carried out at a temperature high enough to secure reasonably rapid hardening, but not at a temperature which is conducive to the formation of bubbles. Thus, a temperature of 65 to 75° C. is preferable, although higher or lower temperatures may be used in some cases.

As set forth in the companion application 735,600, thin splittings of mica of about one inch in diameter were coated on one side with this solution and these were laid on a wire screen in such a manner that the edges overlapped to form a sheet. The sheet was dried for about 10 minutes at 80° C. and then coated on the other side and similarly dried. Two such sheets were placed together and on either side was placed an additional sheet which was coated on one side only, that side being the one in contact with the two inner sheets. The four sheets were amalgamated into a composite sheet in the hydraulic press under a pressure of 2000 pounds for 10 minutes at 120° C. A firm stiff well-bonded composite sheet made up of the cemented mica splittings was thus obtained. The sheet was light colored and translucent. Such procedures may be utilized in producing laminated glass as set forth hereinabove.

The invention, it should be noted, in its broader aspects, embraces a transparent sheet made up of panes of glass joined by an adherent plastic sandwich layer, containing essentially a resin, preferably a synthetic resin, substantially light-fast, that is substantially not discoloring on protracted exposure to light.

What I claim is:

1. A transparent laminated integral sheet consisting of two panes of glass and an adherent plastic sandwich layer containing substantially light-fast urea resin and glycerol.

2. A transparent laminated integral sheet consisting of two panes of glass and an adherent plastic sandwich layer containing substantially light-fast urea resin and a polyhydric alcohol.

3. A transparent laminated integral sheet comprising two panes of glass cemented together by a composition containing urea resin and a plasticizing resin.

4. A transparent laminated integral sheet consisting of two panes of glass cemented together by a composition containing a urea resin and glycerol.

5. A transparent laminated integral sheet comprising two panes of glass cemented together by a composition containing urea resin and glycol.

6. A transparent laminated integral sheet comprising two panes of glass cemented together by a composition containing urea resin, glycerine and glycol.

7. A laminated product comprising at least two sheets of material cemented together by a binding agent including an acid catalyzed urea formaldehyde type resin.

8. A laminated integral sheet comprising two panes of glass, an interposed sheet of Celluloid between said panes of glass, the Celluloid and glass being cemented together by a composition containing urea resin and a plasticizer.

9. In the method of forming laminated glass having a layer of a material containing an organic derivative of cellulose between sheets of glass, the step of applying an adhesive coating composition containing a urea-phenol-aldehyde resin that is compatible with said derivative of cellulose.

10. In the method of forming laminated glass having a layer of a material containing cellulose acetate between sheets of glass, the step of applying an adhesive coating composition containing a urea-phenol-aldehyde resin that is compatible with said cellulose acetate.

11. In the method of forming laminated glass having a layer of a material containing an organic derivative of cellulose between sheets of glass, the step of applying an adhesive coating composition containing a urea-phenol-formaldehyde resin.

12. In the method of forming laminated glass having a layer of a material containing cellulose acetate between sheets of glass, the step of applying an adhesive coating composition containing a urea-phenol-formaldehyde resin.

13. Laminated glass having at least one layer of a plastic sheet containing an organic derivative of cellulose interposed between sheets of glass and having a film of a urea-phenol-aldehyde resin to cause adhesion between the plastic sheet and the glass.

14. Laminated glass having at least one layer of a plastic sheet containing cellulose acetate interposed between sheets of glass and having a film of a urea-phenol-aldehyde resin to cause adhesion between the plastic sheet and the glass.

15. Laminated glass having at least one layer of a plastic sheet containing an organic derivative of cellulose interposed between sheets of glass and having a film containing a urea-phenol-formaldehyde resin to cause adhesion between the plastic sheet and the glass.

16. Laminated glass having at least one layer of a plastic sheet containing cellulose acetate interposed between sheets of glass and having a film containing a urea-phenol-formaldehyde resin to cause adhesion between the plastic sheet and the glass.

17. Laminated glass having at least one continuous layer of a plastic material containing a derivative of cellulose interposed between at least two sheets of glass and being caused to adhere thereto by means of an adhesive containing a synthetic resin compatible with the derivative of cellulose.

18. Laminated glass having at least one continuous layer of a plastic material containing cellulose acetate interposed between at least two sheets of glass and being caused to adhere thereto by means of an adhesive containing a synthetic resin compatible with the derivative of cellulose.

19. Laminated glass having at least one layer of a plastic sheet containing an organic derivative of cellulose interposed between sheets of glass and having a film of a urea-aldehyde resin to cause adhesion between the plastic sheet and the glass.

20. Laminated glass having a film of a urea-phenol aldehyde resin to cause adhesion between the laminations.

21. Laminated glass having at least one continuous layer of a plastic material containing a derivative of cellulose interposed between at least two sheets of glass and being caused to adhere thereto by means of an adhesive containing a light stable synthetic resin.

CARLETON ELLIS.